(12) United States Patent
Nishino et al.

(10) Patent No.: US 7,515,130 B2
(45) Date of Patent: Apr. 7, 2009

(54) IMAGE PICK-UP DEVICE WITH DOUBLE-SIDED DISPLAY TYPE MONITOR

(75) Inventors: Toshiharu Nishino, Hamura (JP); Kunpei Kobayashi, Tachikawa (JP); Norihiro Arai, Hino (JP)

(73) Assignee: Casio Computer Co., Ltd., Tokyo (JP)

( * ) Notice: Subject to any disclaimer, the term of this patent is extended or adjusted under 35 U.S.C. 154(b) by 749 days.

(21) Appl. No.: 11/018,235

(22) Filed: Dec. 20, 2004

(65) Prior Publication Data
US 2005/0141063 A1   Jun. 30, 2005

(30) Foreign Application Priority Data
Dec. 25, 2003   (JP)   ............... 2003-429356

(51) Int. Cl.
*G09G 3/36* (2006.01)
(52) U.S. Cl. .................................. 345/87; 396/281
(58) Field of Classification Search .............. 345/87; 455/550.1; 396/281
See application file for complete search history.

(56) References Cited

U.S. PATENT DOCUMENTS

| | | | | |
|---|---|---|---|---|
| 6,839,101 B2 * | 1/2005 | Shima | ........................ | 349/58 |
| 7,283,854 B2 * | 10/2007 | Sato et al. | ................ | 455/575.3 |
| 7,292,296 B2 * | 11/2007 | Kanbe et al. | ................ | 349/114 |

FOREIGN PATENT DOCUMENTS

| | | |
|---|---|---|
| CN | 1379609 A | 11/2002 |
| JP | 05-150233 A | 6/1993 |
| JP | 08-152619 A | 6/1996 |
| JP | 2000-022995 A | 1/2000 |
| JP | 2000-92367 A | 3/2000 |
| JP | 2001-257911 A | 9/2001 |
| JP | 2001-311939 A | 11/2001 |
| KR | 2002-0097420 A | 12/2002 |

OTHER PUBLICATIONS

Japanese Office Action (and English translation thereof) dated Oct. 21, 2008, issued in a counterpart Japanese Application.

* cited by examiner

*Primary Examiner*—Richard Hjerpe
*Assistant Examiner*—Tom V Sheng
(74) *Attorney, Agent, or Firm*—Frishauf, Holtz, Goodman & Chick, P.C.

(57) ABSTRACT

An electronic device with a display device, includes a device body having a first display window on a first surface of the device body and a second display window corresponding to the first display window on a second surface opposing the first surface. A display device is placed in the device body, has a first side facing the first display window and a second side opposing the first side and facing the second display window, and allows observation of images from sides of the first and second sides. An electronic circuit is provided in the device body and drives at least the display device.

19 Claims, 4 Drawing Sheets

IMAGE PICK-UP DEVICE WITH DOUBLE-SIDED DISPLAY TYPE MONITOR

CROSS-REFERENCE TO RELATED APPLICATIONS

This application is based upon and claims the benefit of priority from prior Japanese Patent Application No. 2003-429356, filed Dec. 25, 2003, the entire contents of which are incorporated herein by reference.

BACKGROUND OF THE INVENTION

1. Field of the Invention

The present invention relates to an image pick-up or sensing device including a monitor which allows observation from the two surfaces of a display device, and an image sensing means.

2. Description of the Related Art

For example, as an image sensing device with a monitor such as a digital camera, there is known a device allowing the observation of monitor images both from the side opposite to an object and from the object side.

An image sensing device with a monitor of this type includes a device body which has a display window on the rear surface and incorporates a monitor image display device such as a liquid crystal display device facing the display window, and an image pick-up or sensing unit which incorporates an electronic image sensing means having an imaging lens, with the objective lens side of the imaging lens being exposed to the outside. The image sensing unit is pivotally supported on one side of the device body so as to be pivotal between a position in which the objective lens side is directed to the front side of the device body and a position in which the objective lens side is directed to the rear side of the device body (see Jpn. Pat. Appln. KOKAI Publication No. 2000-92367).

The above conventional image sensing device with the monitor is designed to display monitor images on the display window on the rear surface of the device body both when an object such as scenery is to be sensed and when an object such as the user himself/herself is to be sensed. For this reason, when an object such as scenery is to be sensed, the image sensing unit is pivoted to the position in which the objective lens side is directed to the front side of the device body, whereas when an object such as the user himself/herself is to be sensed, the image sensing unit must be pivoted to the position in which the objective lens side is directed to the rear side of the device body. This is a cumbersome operation.

In addition, the conventional image sensing device with the monitor includes a monitor image display device in the device body, and an electronic image sensing means having an imaging lens which is provided for the image sensing unit independently of the device body. This image sensing unit is pivotally supported on one side of the device body. This complicates the structure and increases the manufacturing cost.

BRIEF SUMMARY OF THE INVENTION

It is an object of the present invention to provide an image sensing device with a monitor which allows the observation of monitor images both from the side opposite to an object and from the object side and easy use of the device, has a simple structure, and can be manufactured at a low cost.

According to a first aspect of the present invention, there is provided an electronic device with a display device, comprising:

a device body having a first display window on a first surface of the device body and a second display window corresponding to the first display window on a second surface opposing the first surface; and a display device which is placed in the device body, has a first side facing the first display window and a second side opposing the first side and facing the second display window, the display device being driven by an electronic circuit to display images which are observed from the first and second sides.

In the electronic device with the monitor according to this aspect, the device body preferably comprises an imaging lens which is provided on one surface or a first surface of the device to form an image on an electronic image sensing device. In addition, the display device may be a transmission type liquid crystal display device which displays a first image using light exiting from the other surface or a second surface by controlling transmission of light entering from one surface or a first surface of the device, and displays a second image using light exiting from one surface by controlling transmission of light entering from the other surface.

In this case, a display window shielding plate which reflects light which enters from the first or second display window and is transmitted through the liquid crystal display device may be provided on one or the other surface of the device body so as to be retractable from the display window. In addition, the device body may further include a surface light source which is provided between the liquid crystal display device and at least one of the first display window and the second display window, emits illumination light toward the liquid crystal display device and transmits light entering from a surface on a side facing one display window and a surface on a side facing the liquid crystal display device.

The display device may include a semi-transmission/reflection type liquid crystal display device which performs transmission display of a first image using light exiting from the other surface by controlling transmission of part of light entering from one surface, performs transmission display of a second image using light exiting from one surface by controlling transmission of part of light entering from the other surface, and performs reflection display of a first image using reflected light from one surface by reflecting other part of the light entering from one surface and controlling an intensity of light exiting from one surface.

According to a second aspect of the present invention, there is provided an image sensing device with a monitor, comprising:

a device body which houses at least an electronic circuit which drives a display device and electronic image sensing means, the device body including an imaging lens and a first display window which are formed on a front surface of the device body, and including a second display window which corresponds to the first display window and is formed on a rear surface opposing the front surface of the device body; and a double-sided display type monitor image display device which is placed in the device body such that a first surface faces the first display window and a second surface opposing the first surface faces the second display window, and displays images sensed by the electronic image sensing means on the first surface and the second surface so as to allow observation of the images from the front surface and the rear surface of the device body.

In this case, the monitor image display device may include a transmission type liquid crystal display device in which electrodes forming a plurality of pixels arranged in a matrix form are provided in opposing regions on opposing inner surfaces of a pair of substrates which face each other through a liquid crystal layer, and polarizing plates are respectively placed on outer surfaces of the pair of substrates. In addition, the transmission type liquid crystal display device preferably includes a display window shielding plate provided on the rear surface of the device body so as to be retractable from the first display window, the display shielding plate reflecting light which enters from a surface facing the second display window and is transmitted through the transmission type liquid crystal display device.

Preferably, the display window shielding plate is provided so as to be slidable between a closed state in which the plate covers the first display window and an open state in which the plate is retracted to a side of the first display window, and includes a scattering/reflecting plate which scatters and reflects light transmitted through the liquid crystal display device. In addition, a surface light source which emits illumination light to the transmission type liquid crystal device, and transmits light entering from a surface facing the second display window and a surface facing the transmission liquid crystal display device is preferably placed between the second display window and the transmission type liquid crystal display device.

In the image sensing device with the monitor according to this aspect, the monitor image display device may be a semi-transmission/reflection type liquid crystal display device which comprises electrodes forming a plurality of pixels arranged in a matrix form provided in opposing regions on opposing inner surfaces of a pair of substrates which face each other through a liquid crystal layer, a reflecting film which reflects part of light entering from the monitor image display device, and polarizing plates provided on outer surfaces of the pair of substrates, performs transmission display of a first image using light exiting from the other surface by controlling transmission of part of light entering from one surface or the first surface, performs transmission display of a second image using light exiting from one surface by controlling transmission of part of light entering from the other surface or the second surface, and performs reflection display of the first image using reflected light from one surface by reflecting other part of the light entering from one surface and controlling an intensity of light exiting from one surface.

In this case, preferably, the monitor image display device is a semi-transmission/reflection type liquid crystal display device in which reflecting films partially corresponding to the plurality of pixels are provided between a substrate surface of one substrate and the electrodes on the inner surface of the substrate, reflection display portions which make the reflecting films reflect light entering from the outer surface of the other substrate and make the light exit to the outer surface of the other substrate are formed from regions corresponding to the reflecting films in the plurality of pixels, and transmission display portions which transmit light entering from the outer surface of one substrate and make the light exit to the outer surface of the other substrate are formed from other regions which do not correspond to the reflecting films, and the substrate on the side where the reflecting films are provided is placed to face the second display window.

Preferably, this semi-transmission/reflection type liquid crystal display device further includes a diffusion layer which is provided between the polarizing plate and the substrate located on the second display window side and diffuses transmitted light. In addition, a surface light source which emits illumination light to the semi-transmission/reflection type liquid crystal display device, and transmits light entering from a surface facing the second display window and a surface facing the transmission type liquid crystal display device is preferably placed between the second display window and the semi-transmission/reflection type liquid crystal display device.

The device body of the image sensing device with the monitor according to this aspect preferably comprises switching means, provided for the monitor image display device, for switching between front-surface display observed from one surface side and rear-surface display observed from the other surface side on a rear side of one surface. The electronic circuit which drives the display device comprises image inverting means for displaying a laterally inverted image obtained by laterally inverting an image in accordance with operation of the switching means.

According to a third aspect of the present invention, there is provided a digital camera with a monitor, comprising:

a device body which houses at least an electronic circuit which drives a display device and electronic image sensing means, includes an imaging lens and a first display window which are formed on a front surface of the device body, the device body further including a second display window which corresponds to the first display window and is formed on a rear surface opposing the front surface of the device body;

a semi-transmission/reflection type liquid crystal display device which comprises electrodes forming a plurality of pixels arranged in a matrix form provided in opposing regions on opposing inner surfaces of a pair of substrates which face each other through a liquid crystal layer, at least one reflecting film which reflects part of light entering from the monitor image display device, and polarizing plates provided on outer surfaces of the pair of substrates, is placed in the device body such that a first surface faces the first display window and a second surface on a rear side of the first surface faces the second display window, performs transmission display of a first image using light exiting from the second surface by controlling transmission of part of light entering from the first surface, performs transmission display of a second image using light exiting from the first surface by controlling transmission of part of light entering from the second surface, and performs reflection display of the first image using reflected light from the first surface by reflecting other part of the light entering from the first surface so as to control an intensity of light exiting from the first surface; and a surface light source which is placed between the second display window and the semi-transmission/reflection type liquid crystal display device, emits illumination light to the semi-transmission/reflection type liquid crystal display device, and transmits light entering from a surface facing the second display window and a surface facing the transmission type liquid crystal display device.

The electronic device with the display device according to this aspect allows the observation of monitor images both from the opposite side to an object and from the object side because the electronic device includes a device body having first and second display windows formed on one surface or the first surface and the other surface or the second surface, respectively, and a double-sided display type display device placed in correspondence with the first and second display windows.

As the electronic device with the display device according to this aspect, an image sensing device including an electronic image sensing means can be used. In this case, this image sensing device with the display device can display images on the rear surface or the second surface and the front surface or the first surface of the device body, respectively. For this reason, when an object such as scenery is to be sensed, the user directs the front surface of the device body, i.e., the surface on which the objective lens side of the imaging lens is exposed, to the object such as scenery, and performs an image sensing operation while watching a monitor image displayed on the second display window on the rear surface of the device body. When an object such as the user himself/herself is to be sensed, the user directs the front surface of the device body (the objective lens side of the imaging lens) to the user, and can perform an image sensing operation while watching a monitor image displayed on the first display window.

According to this arrangement, when a transmission liquid crystal display device is to be used as the above display device, an image can be displayed by using external light entering from each display window. When a transmission liquid crystal display device is used as a display device, reflection display can be performed by placing a display window shielding plate on one of the display windows. In addition, providing a surface light source makes it possible to display images in even a place where external light is weak.

In the image sensing device with the monitor according to this aspect, the second display window is provided on the rear surface of the device body housing the electronic image sensing means, and the double-sided display type monitor image display device is placed in the device body in correspondence with the first and second display windows respectively provided on the front and rear surfaces of the device body. This makes it possible to see monitor images both from the opposite side to an object and from the object side.

The image sensing device with the monitor according to this aspect is suitable for a digital electronic camera including an electronic image sensing means.

According to the digital electronic camera with the monitor, monitor images can be displayed on the display windows on the rear and front surfaces of the device body. When, therefore, an object such as scenery is to be sensed, the user directs the front surface of the device body, i.e., the surface on which the objective lens side of the imaging lens is exposed, to the object such as scenery, and performs an image sensing operation while watching a monitor image displayed on the second display window of the device body. When an object such as the user himself/herself is to sensed, the user directs the front surface of the device body (the exposed surface of the incident end of the imaging lens) to the user side, and can perform an image sensing operation while watching a monitor image displayed on the first display window on the front surface of the device body.

The image sensing device with the monitor and the digital electronic camera allow the user to perform an image sensing operation while watching a monitor image of an object, by only directing the front surface of the device body, i.e., the incident end of the imaging lens, to the object both when an object such as scenery is to be sensed and when an object such as the user himself/herself is to be sensed. Therefore, the user can easily use the device.

In addition, the image sensing device with the monitor and the digital electronic camera include, in the device body, both an electronic image sensing means having an imaging lens and a monitor image display device. Therefore, this device has a simple structure and can be manufactured at a low cost.

In the image sensing device with the monitor and the digital electronic camera according to this aspect, the monitor image display device may be a transmission liquid crystal display device which includes electrodes forming a plurality of pixels arranged in a matrix form in opposing regions on the opposing inner surfaces of a pair of substrates which face each other through a liquid crystal layer, and polarizing plates placed on the outer surfaces of the pair of substrates. Using this transmission liquid crystal display device makes it possible to display a monitor image of an object such as scenery on the second display window by the transmission display mode using external light entering from the first display window and to display a monitor image of an object such as the user himself/herself on the first display window by the transmission display mode using external light entering from the second display window.

When the above transmission liquid crystal display device is to be used as the monitor image display device, a display window shielding plate which reflects light which enters from a surface facing the second display window and is transmitted through the transmission liquid crystal display device is preferably provided on the front surface of the device body so as to be slidable between the closed state wherein the plate covers the first display window and the open state wherein the plate is retracted to a side of the first display window. With this arrangement, a monitor image of an object such as scenery can be displayed on the second display window by arbitrarily selecting either the transmission display mode using external light entering from the first display window or the reflection display mode using external light entering from the second display window (the display mode of making the display window shielding plate reflect light transmitted through the transmission liquid crystal display device). In addition, when a monitor image of an object such as scenery is displayed on the second display window by the reflection display mode, the first display window can be covered with the display window shielding plate.

When a transmission liquid crystal display device is used as the monitor image display device and the display window shielding plate is to be provided on the front surface of the device body, a surface light source which emits illumination light toward the transmission liquid crystal display device and transmits light entering from a surface facing the second display window and a surface facing the transmission liquid crystal display device is preferably further provided between the second display window and the transmission liquid crystal display device. With this arrangement, a monitor image of an object such as scenery can be displayed on the second display window by the reflection display mode using illumination light from the surface light source in addition to the transmission display mode and reflection display mode both using the external light. In addition, a monitor image of an object such as the user himself/herself can be displayed on the first display window by the transmission display mode using illumination light from the surface light source in addition to the transmission display mode using external light entering from the second display window.

In addition, in the image sensing device with the monitor and the digital electronic camera according to this aspect, the monitor image display device may be a semi-transmission/reflection type liquid crystal display device having an arrangement in which electrodes forming a plurality of pixel arranged in a matrix form are provided in the opposing regions on the opposing inner surfaces of a pair of substrates which face each other through a liquid crystal layer, reflecting films partially corresponding to the plurality of pixels are provided between the substrate surface of one substrate and the electrodes on the inner surface of the substrate, and polarizing plates are arranged on the outer surfaces of the pair of substrates. Reflection display portions which reflect light which enters from the outer surface side of the other substrate, and make the light exit from the outer surface side of the other substrate are formed in regions corresponding to the reflecting films in the plurality of pixels. Transmission display portions which transmit light entering from the outer surface side of one substrate and make the light exit to the outer surface side of the other substrate are formed in other regions.

In this case, the semi-transmission/reflection type liquid crystal display device is preferably placed such that the surface on the side where the reflecting films are provided faces the first display window. With this arrangement, a monitor image of an object such as scenery can be displayed on the second display window by selecting either the transmission display mode using external light entering from the first display window or the reflection display mode using external light entering from the second display window (the reflection display mode of causing the semi-transmission/reflection type liquid crystal display device to make the reflecting films reflect light which enters from a surface facing the second display window and is transmitted through the liquid crystal layer). In addition, a monitor image of an object such as the user himself/herself can be displayed on the first display window by the transmission display mode using external light entering from the second display window.

As described above, when the semi-transmission/reflection type liquid crystal display device is used as the monitor image display device and is placed such that the surface on the side where the reflecting films are provided faces the first display window, a surface light source which emits illumination light to the semi-transmission/reflection type liquid crystal display device and transmits light entering from a surface facing the second display window and a surface facing the semi-transmission/reflection type liquid crystal display device is preferably placed between the second display window and the semi-transmission/reflection type liquid crystal display device. With this arrangement, a monitor image of an object such as scenery can be displayed on the first display window by the reflection display mode using illumination light from the surface light source in addition to the transmission display mode and reflection display mode both using the external light. In addition, a monitor image of an object such as the user himself/herself can be displayed on the first display window by the transmission display mode using illumination light from the surface light source in addition to the transmission display mode using external light entering from the second display window.

In the image sensing device with the monitor and the digital electronic camera according to this aspect, it is preferable to provide a switching means for switching between a front-surface display mode of observing an image from one surface side and rear-surface display mode of observing an image from the other surface side, i.e., the rear side of one surface, and an image converting means for displaying a laterally converted image by laterally converting an image in accordance with the operation of the switching means. This arrangement always allows the observation of normal images from the front and rear sides of the image sensing device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
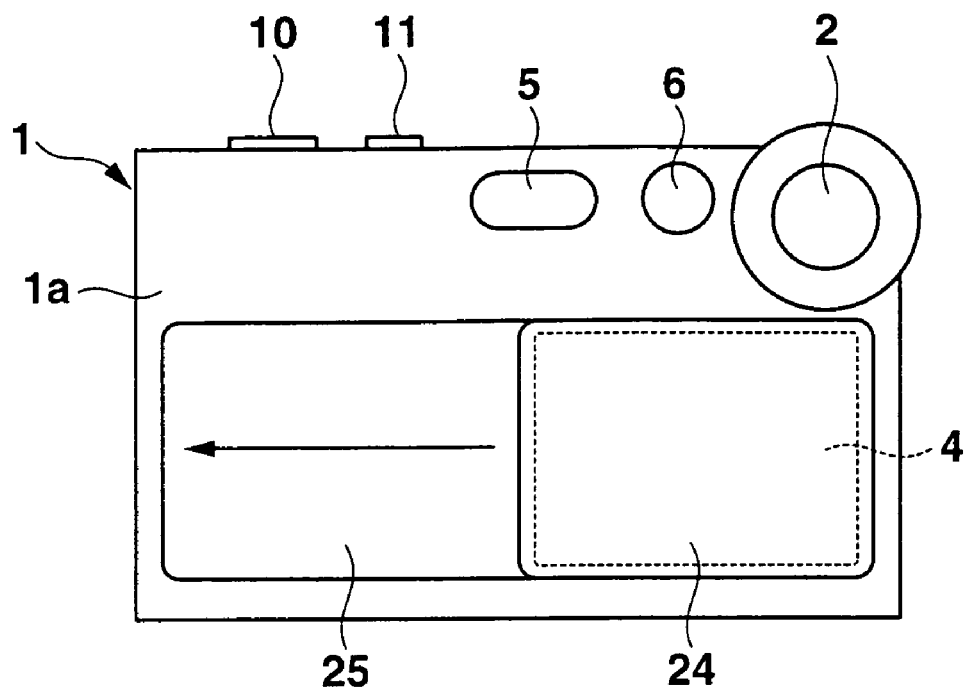
FIG. 1 is a view of a digital camera with a monitor according to the first embodiment of the present invention when viewed from the front surface side.
Figure 2:
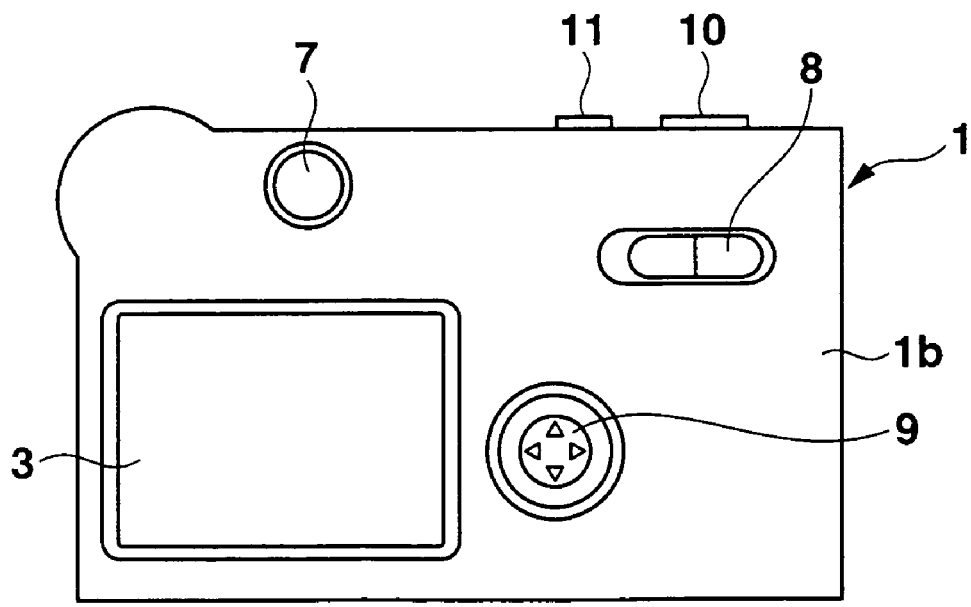
FIG. 2 is a view of the digital camera in FIG. 1 when viewed from the rear surface side.
Figure 3:
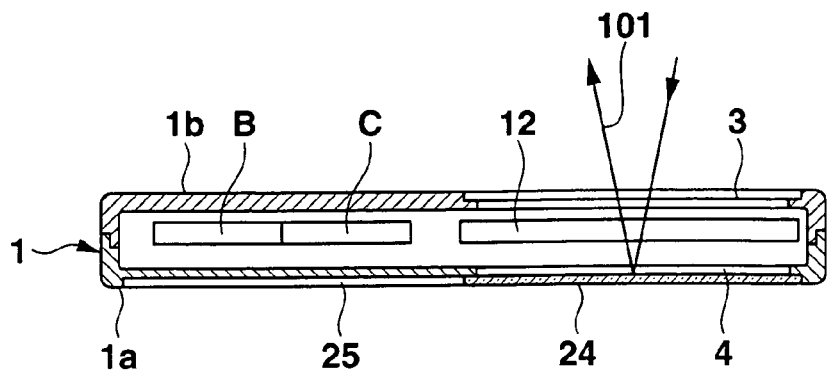
FIG. 3 is a sectional view showing the digital camera in FIG. 1 while the shielding plate is closed.
Figure 4:
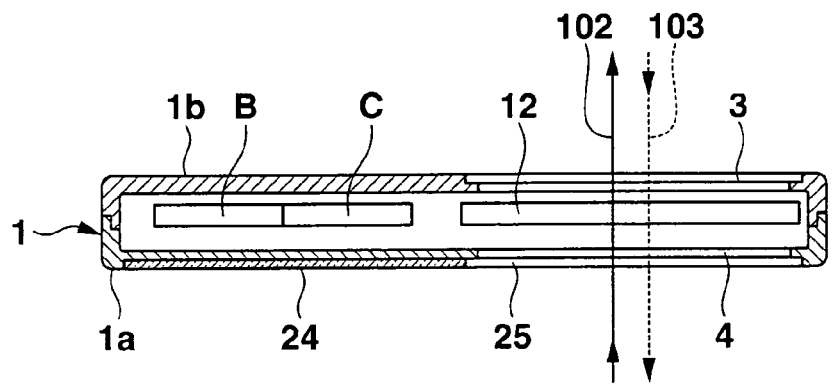
FIG. 4 is a sectional view showing the digital camera in FIG. 1 while the shielding plate is open.

FIGS. 1 to 5 show a first embodiment in which the present invention is applied to a digital camera with a monitor. FIGS. 1 and 2 are views taken from the front surface and rear surface of the digital camera, respectively. FIGS. 3 and 4 are sectional views of the digital camera with its shielding plate being closed and opened, respectively.

As shown in FIGS. 1 to 4, the digital camera with the monitor according to this embodiment includes a flat device body 1 (to be referred to as a camera body hereinafter) having a front surface or first surface 1a and a rear surface or second surface 1b which are substantially parallel to each other, and an imaging lens 2. The device body 1 includes an electronic image pick-up or sensing means which is provided with the imaging lens 2 on the front surface 1a of the camera body 1, a second display window 3 provided on the rear surface 1b of the camera body 1, a first display window 4 which is provided on the front surface 1a of the camera body 1 in correspondence with the second display window 3, a double-sided display type monitor image display device 12 which is placed in the camera body 1 such that one surface or the first surface faces the second display window 3, and the other surface or the second surface faces the first display window 4, and a display window shielding plate 24 slidably provided on the front surface of the camera body 1.

The electronic image sensing means is comprised of the imaging lens 2, a (charge-coupled device) (CCD) (not shown) which is placed to face the imaging plane formed by the imaging lens 2, and an electronic circuit. The electronic image sensing means is provided while the objective lens side of the imaging lens 2 is exposed on the upper end portion of one side of the front surface of the camera body 1.

The first and second display windows 4 and 3 are substantially rectangular windows having a similar or the same area. The display windows 3 and 4 are located below the imaging lens 2. Although not shown, transparent glass plates are fitted in the first and second display windows 3 and 4, respectively.

A flash light emitting unit 5, optical finder 6, and the like are provided on the front surface 1a of the camera body 1. An eyepiece unit 7 of the optical finder 6, an image sensing/ replay switch 8, an image sensing mode selection key 9, and the like are provided on the rear surface 1b of the camera body 1. A shutter button 10 and the like are provided on the upper surface of the camera body 1. A connecting portion for an external device such as a personal computer or printer, a memory card insertion portion (neither of which is shown), and the like are provided on the lower surface of the camera body 1.

In addition, an image reversing or inverting key 11 for making the monitor image display device 12 display a laterally reversed image is provided on either the front/rear surface or the upper surface, e.g., the upper surface, of the camera body 1.

The double-sided display type monitor image display device 12 has display areas almost corresponding to the entire regions of the first and second display windows 4 and 3. In this embodiment, a transmission type liquid crystal display device is used as this device. The monitor image display device 12 will be referred to as a transmission type liquid crystal display device hereinafter.

Figure 5:
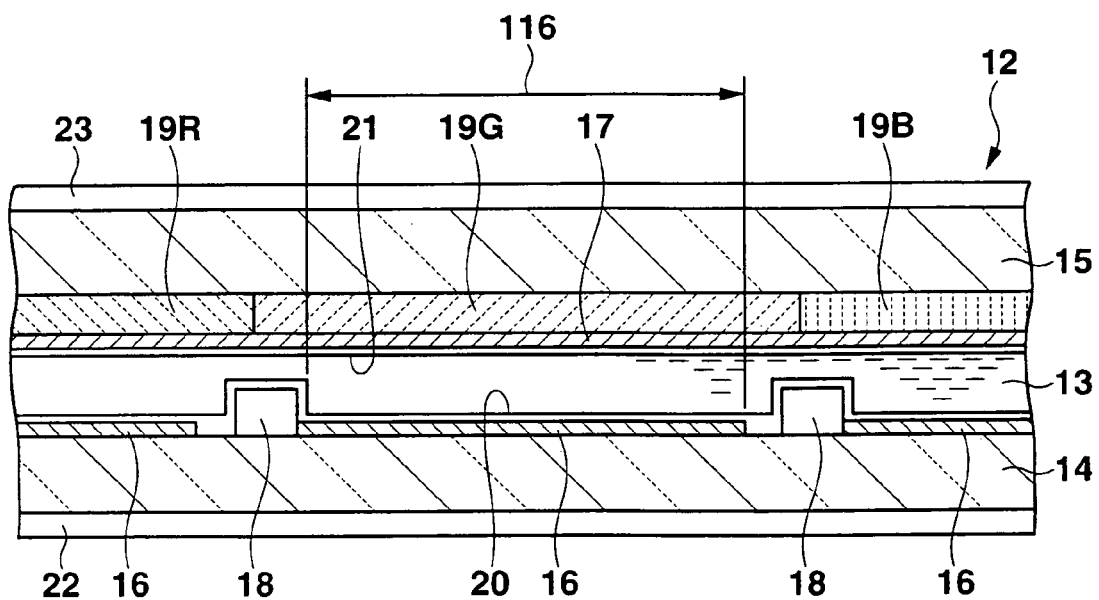
FIG. 5 is a sectional view of part of a transmission liquid crystal display device.

FIG. 5 is a sectional view of part of the transmission type liquid crystal display device 12. The transmission type liquid crystal display device 12 has an arrangement in which transparent electrodes 16 and 17 forming a plurality of pixels 116 arranged in a matrix form in the row direction (the horizontal direction of the screen) and column direction (the vertical direction of the screen) are provided in the opposing regions on the opposing inner surfaces of a pair of transparent substrates 14 and 15 which face each other through a liquid crystal layer 13. Polarizing plates 22 and 23 are arranged on the outer surfaces of the pair of substrates 14 and 15.

The transmission type liquid crystal display device 12 is an active matrix liquid crystal display device which is designed such that the plurality of pixel electrodes 16 arranged in a matrix form, a plurality of thin-film transistors (TFTs) 18 respectively connected to the pixel electrodes 16, and a plurality of gate and data interconnections (not shown) are provided on the inner surface of one of the substrates, e.g., the lower substrate (to be referred to a rear substrate hereinafter) 14 in FIG. 5, and the counter electrode 17 in the form of a single film is provided on the inner surface of the other substrate, i.e., the upper substrate (to be referred to as a front substrate hereinafter) 15 in FIG. 5. The counter electrode 17 is formed on color filters 19R, 19G, and 19B of three colors, i.e., red, green, and blue, provided on the inner surface of the front substrate 15 in correspondence with the plurality of pixels 116.

Although the TFTs 18 is simply shown in FIG. 5, each TFT 18 is comprised of a gate electrode formed on the substrate surface of the rear substrate 14, a gate insulating film provided to cover the gate electrode, an i-type semiconductor film formed on the gate insulating film to face the gate electrode, source and drain electrodes formed on n-type semiconductor films on two side portions of the i-type semiconductor film, and an overcoat insulating film which covers them. The gate electrode is integrally formed with a gate interconnection. The drain electrode is connected to a data interconnection. The source electrode is connected to the pixel electrode 16.

Aligning films 20 and 21 are provided on sides of the inner surfaces of the pair of substrates 14 and 15 so as to cover the electrodes 16 and 17. The substrates 14 and 15 are joined to each other through a seal member (not shown) which surrounds the display area where the plurality of pixels 116 are arranged in a matrix form. The liquid crystal layer 13 is provided in the area surrounded by the seal member between the pair of substrates 14 and 15.

The transmission type liquid crystal display device 12 is, for example, a normally white mode (twisted nematic) (TN) liquid crystal display device, in which the liquid crystal molecules of the liquid crystal layer 13 are twisted/aligned at a twist angle of 900 between the pair of substrates 14 and 15, and the polarizing plates 22 and 23 are placed on the outer surfaces of the pair of substrates 14 and 15 such that their transmission axes are substantially perpendicular to each other.

The transmission type liquid crystal display device 12 controls the transmission of light entering from one surface in accordance with the electric fields applied to the liquid crystal layer 13 of the plurality of pixels 116 so as to display an image on the other surface. The transmission type liquid crystal display device 12 also controls the transmission of light entering from the other surface in accordance with the electric fields applied to the liquid crystal layer 13 of the plurality of pixels 116 so as to display an image on one surface. Each image displayed on either of the surfaces is a full-color image formed from three colors, i.e., red, green, and blue, which is colored by the color filters 19R, 19G, and 19B corresponding to each of the plurality of pixels 116.

The transmission type liquid crystal display device 12 is placed in the camera body 1 such that one surface, e.g., the front surface (the outer surface of the front-side polarizing plate 23) is made to face the first display window 4, and the other surface, i.e., the rear surface (the outer surface of the rear-side polarizing plate 22) is made to face the second display window 3, and is connected to a conventional display device driving circuit or electronic circuit B incorporated in the camera body 1.

The camera body 1 incorporates a CCD driving unit which drives the CCD of the electronic image sensing means, a data write unit which writes sensed data from the CCD into a built-in memory or detachable image memory, and a conventional sensed data processing circuit C formed from an output portion for the above sensed data and the like. The display device driving circuit B is electrically connected to the sensed data processing circuit.

A display window shielding plate 24 provided on the front surface of the camera body 1 is formed from a scattering/reflecting plate which scatters and reflects light which enters the transmission type liquid crystal display device 12 from a surface facing the second display window 3 and is transmitted through the transmission type liquid crystal display device 12. For example, this plate is formed from a reflecting plate obtained by applying a scatter/reflection process to the surface of a high-reflectance metal plate or a reflecting plate obtained by providing a reflecting film on one surface of a transparent resin plate dispersed with light scattering particles.

As shown in FIG. 1, the display window shielding plate 24 is fitted in an oblong shielding plate guiding portion 25 so as to be slidable in the longitudinal direction as shown by an arrow. The shielding plate guiding portion 25 is formed by reentering the front surface of the camera body 1 by a depth almost equal to the thickness of the display window shielding plate 24. The display window shielding plate 24 is manually slid between the closed state (the state shown in FIGS. 1 and 3) where it closes the first display window 4 provided on the front surface of the camera body 1 and the open state (the state shown in FIG. 4) where the plate is retracted to a side of the first display window 4.

The cover 24 is a rectangular plate having an area slightly larger than that of the first display window 4, and a decorative coating is applied to its outer surface, i.e., the surface exposed to the outside.

The above mentioned digital camera is designed such that the electronic image sensing means is provided in the camera body 1 with the incident end of the imaging lens 2 being exposed from the front surface 1a of the camera body 1 to the outside, the second display window 3 is provided on the rear surface 1b of the camera body 1, the first display window 4 is provided on the front surface of the camera body 1 in correspondence with the second display window 3, and the transmission type liquid crystal display device 12 is provided as a double-sided display type monitor image display device in the camera body 1 while one surface of the device faces the second display window 3, and the other surface faces the first display window 4. With this arrangement, the user can see a monitor image from both the opposite side to the object and the object side.

Since this digital camera can display monitor images on both the display windows 3 and 4 on the opposite sides of the camera body 1, when an object such as scenery is to be imaged, the front surface 1a of the camera body 1, i.e., the surface located on the objective lens side of the imaging lens 2, is made to face the object such as scenery to allow the user to sense the object while watching a monitor image displayed on the second display window 3 on the rear surface 1b of the camera body 1. When an object such as the user himself/herself is to be imaged, the front surface 1a of the camera body 1 (on the objective lens side of the imaging lens 2) is made to face the user to allow the user to sense the object while watching a monitor image displayed on the first display window 4 on the front surface of the camera body 1.

This makes it possible for this digital camera to allow the user to sense both an object such as scenery and an object such as the user himself/herself while watching monitor images of the objects by simply directing the front surface 1a of the camera body 1, i.e., the side located on the objective lens side of the imaging lens 2, to the object. This therefore makes it easy to use the digital camera.

Note that an image displayed on the second display window 3 is an image seen when display on the transmission type liquid crystal display device 12 is viewed from one surface side, and an image displayed on the first display window 4 is an image seen when display on the transmission type liquid crystal display device 12 is viewed from the other surface side. When, therefore, the transmission type liquid crystal display device 12 is driven by the same writing method in displaying a monitor image of an object such as the user himself/herself as that for the display of a monitor image of an object such as scenery, the monitor image of the object such as the user himself/herself displayed on the first display window 4 becomes a laterally inverted image.

For this reason, the image inverting key 11 is provided on the camera body 1 to operate the display device driving circuit B so as to write laterally inverted image data on the transmission type liquid crystal display device 12 in accordance with the operation of the image inverting key 11, thereby displaying a normal monitor image without lateral inversion on the first display window 4.

In addition, this digital camera incorporates both the electronic image sensing means having the imaging lens 2 and the transmission type liquid crystal display device 12 which displays monitor images in the camera body 1. This makes it possible to manufacture a digital camera with a simple structure at a low cost.

Furthermore, the above digital camera uses, as the monitor image display device 12, a transmission type liquid crystal display device in which the electrodes forming the plurality of pixels arranged in a matrix form in the opposing regions on the opposing inner surfaces of the pair of substrates 14 and 15 which face each other through the liquid crystal layer 13, and the polarizing plates 22 and 23 are respectively provided on the outer surfaces of the pair of substrates 14 and 15. With this arrangement, a monitor image of an object such as scenery can be displayed on the second display window 3 by the transmission display mode using external light entering from the first display window 4, whereas a monitor image of an object such as the user himself/herself can be displayed on the first display window 4 by the transmission display mode using external light entering from the second display window 3.

Moreover, in the above digital camera, the display window shielding plate 24 which reflects light which enters the liquid crystal display device 12 from the surface facing the second display window 3 and is transmitted through the liquid crystal display device 12 is provided on the front surface of the camera body 1 so as to be slidable between the closed state wherein the plate closes the first display window 4 and the open state wherein the plate is retracted to a side of the first display window. This allows a monitor image of an object such as scenery to be displayed on the second display window 3 upon selecting either the transmission display mode using external light entering from the first display window 4 or the reflection display mode using external light entering from the second display window 3 (the display mode of making the display window shielding plate 24 reflect light transmitted through the transmission type liquid crystal display device 12).

That is, a monitor image of an object such as scenery can be displayed on the second display window 3 either in the state wherein the display window shielding plate 24 is closed or in the state wherein the shielding plate 24 is open. When a monitor image of an object such as scenery is displayed on the second display window 3 while the display window shielding plate 24 is closed, light which enters from the second display window 3 and is transmitted through the transmission type liquid crystal display device 12 is reflected by the shielding plate 24 as indicated by an arrow line 101 in FIG. 3, and the reflected light is transmitted through the transmission type liquid crystal display device 12 again to exit from the second display window 3.

Note that in this embodiment, since the display window shielding plate 24 is used as a scattering/reflecting plate, light which enters from the second display window 3 and is transmitted through the liquid crystal display device 12 is scattered and reflected by the display window shielding plate 24 to allow a monitor image to be displayed on the second display window 3 with a uniform luminance distribution at a wide viewing angle.

When a monitor image of an object such as scenery is displayed on the second display window 3 while the display window shielding plate 24 is open, light which enters from the first display window 4 and is transmitted through the liquid crystal display device 12 exits from the second display window 3 as indicated by an arrow line 102 in FIG. 4.

A monitor image of an object such as the user himself/herself is displayed on the first display window 4 while the display window shielding plate 24 is open. In this case, light which enters from the second display window 3 and is transmitted through the liquid crystal display device 12 exits from the second display window 3, as indicated by an arrow line 103 in FIG. 4.

Since the above digital camera includes the display window shielding plate 24, when a monitor image of an object such as scenery is to be displayed on the second display window. 3 by the above reflection display mode, the first display window 4 can be covered with the display window shielding plate 24.

Figure 6:
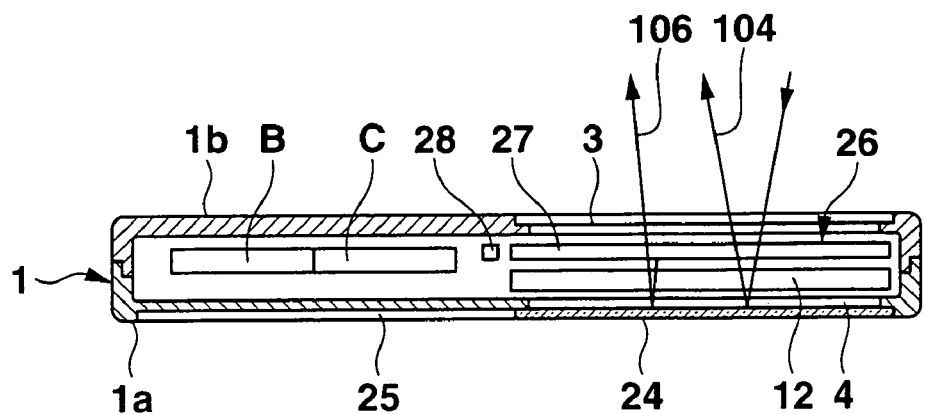
FIG. 6 is a sectional view of a digital camera with a monitor according to the second embodiment of the present invention while the shielding plate is closed.
Figure 7:
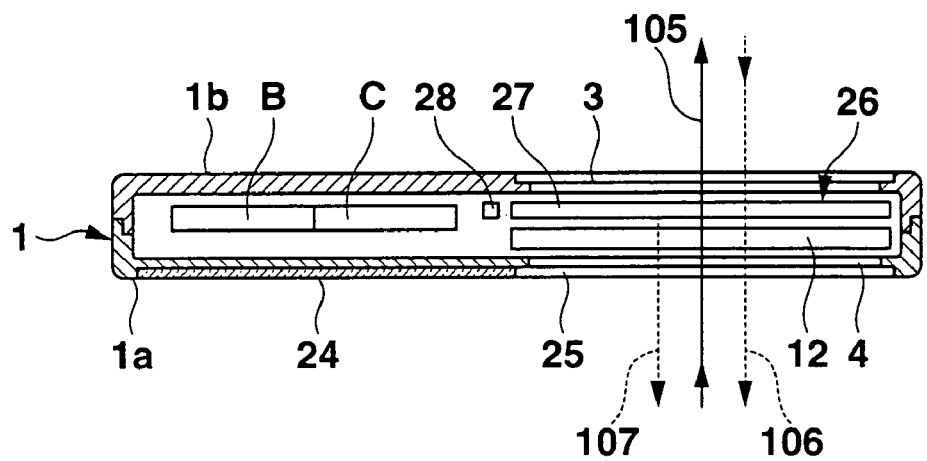
FIG. 7 is a sectional view of the digital camera according to the second embodiment while the shielding plate is open.

FIGS. 6 and 7 are sectional views respectively showing the shielding plate closed state and open state of the above digital camera according to the second embodiment in which the present invention is applied to a digital camera with a monitor.

The digital camera with the monitor according to this embodiment has the same arrangement as that of the digital camera according to the first embodiment except that a surface light source 26 is further placed between the second display window 3 on the rear surface 1b of the camera body 1 and the transmission type liquid crystal display device 12 to emit illumination light toward the liquid crystal display device 12 and transmit light entering from a surface facing the second display window 3 and a surface facing the transmission type liquid crystal display device 12.

The surface light source 26 is comprised of a lightguide plate 27 and a plurality of solid-state light-emitting devices 28. The lightguide plate 27 is formed from a rectangular transparent plate having an area corresponding to at least the entire display area of the transmission type liquid crystal display device 12. An incident end face which allows light to enter is formed on one end face of this plate 27. An exit surface which allows light to exit is formed on one of two plate surfaces. A reflecting surface which allows light entering from the incident end face to exit from the exit surface is formed on the other plate surface. The solid-state light-emitting devices 28 are arranged at proper intervals in the longitudinal direction of the incident end face so as to face the incident end face of the lightguide plate 27. The solid-state light-emitting devices 28 emit white light toward the end face of the lightguide plate 27.

Although not shown, a plurality of elongated groove portions are provided on the entire region of the reflecting surface of the lightguide plate 27 at a pitch almost equal to or smaller than the arrangement pitch (100 to 200 μm) of pixels 116 of the transmission type liquid crystal display device 12 in a direction parallel to the longitudinal direction of the incident end face (the width direction of the lightguide plate).

The solid-state light-emitting device 28 is formed by, for example, molding a red (light-emitting diode) (LED) which emits red light, a green LED which emits green light, and a blue LED which emits blue light with a transparent resin. White color obtained by mixing light of the three colors red, green, and blue emitted by these LEDs is made to exit from the solid-state light-emitting device 28.

The surface light source 26 is designed to guide white light emitted from the solid-state light-emitting devices 28 to the lightguide plate 27 so as to make the light exit from its exit surface with a uniform intensity distribution. Light which is emitted from the solid-state light-emitting devices 28 and enters the lightguide plate 27 from its incident end face is guided in the lightguide plate 27 while being internally reflected by the exit and reflecting surfaces of the lightguide plate 27 and internally reflected by the interfaces between the exit and reflecting surfaces and the air layer which is the open air by total internal reflection. In this process, the light which is internally reflected by the plurality of elongated groove portions of the reflecting surface in a direction in which the angle with respect to the normal to the exit surface decreases is made to exit from the exit surface.

The lightguide plate 27 transmits light entering from its exit surface to make it exit from the reflecting surface, and transmits light entering from the reflecting surface to make it exit from the exit surface.

The surface light source 26 is placed between the second display window 3 and the transmission type liquid crystal display device 12 such that the exit surface of the lightguide plate 27 faces the liquid crystal display device 12 and the reflecting surface of the lightguide plate 27 faces the second display window 3, and is connected to a light source driving circuit (not shown) provided in the camera body 1.

In this embodiment, the light source driving circuit is designed to turn on the solid-state light-emitting devices 28 of the surface light source 26 when the intensity of light received by the CCD of the electronic image sensing means becomes equal to or less than a predetermined intensity. This makes it possible to automatically emit illumination light from the surface light source 26 when display with sufficient luminance cannot be obtained by the above display mode using external light.

In the digital camera of this embodiment, since the surface or plane light source 26 is placed between the second display window 3 and the transmission type liquid crystal display device 12, a monitor image of an object such as scenery can be displayed on the second display window 3 by the reflection display mode using illumination light from the surface light source 26 in addition to the transmission mode using external light entering from the first display window 4 and the reflection display mode using external light entering from the second display window 3 in the first embodiment. In addition, a monitor image of an object such as the user himself/herself can be displayed on the first display window 4 by the transmission display mode using illumination light from the surface light source 26 in addition to the transmission display mode using external light entering from the second display window 3 in the first embodiment.

In the digital camera of this embodiment, a monitor image of an object such as scenery is displayed by the reflection display mode using external light while the display window shielding plate 24 is closed, i.e., the first display window 4 is covered with the display window shielding plate 24. At this time, light entering from the second display window 3 is transmitted through the lightguide plate 27 of the surface light source 26 and enters the transmission type liquid crystal display device 12, as indicated by an arrow line 104 in FIG. 6. The light which is transmitted trough the transmission type liquid crystal display device 12 and reflected by the display window shielding plate 24 is transmitted again through the transmission type liquid crystal display device 12 and the lightguide plate 27 of the surface light source 26 to exit from the second display window 3.

A monitor image of an object such as scenery is displayed by the transmission display mode using external light while the display window shielding plate 24 is open. In this case, light which enters from the first display window 4 and is transmitted through the liquid crystal display device 12 is transmitted through the lightguide plate 27 of the surface light source 26 and exits from the second display window 3, as indicated by an arrow line 105 in FIG. 7.

A monitor image of an object such as scenery is displayed by the reflection display mode using illumination light while the display window shielding plate 24 is closed (the first display window 4 is covered with the shielding plate 24). In this case, illumination light which exits from the exit surface of the lightguide plate 27 of the surface light source 26 enters the liquid crystal display device 12 as indicated by an arrow line 106 in FIG. 6, and the light which is transmitted through the transmission type liquid crystal display device 12 and reflected by the display window shielding plate 24 is transmitted through the liquid crystal display device 12 again. This light is further transmitted through the lightguide plate 27 of the surface light source 26 and exits from the second display window 3.

A monitor image of an object such as the user is displayed on the first display window 4 by the transmission display mode while the display window shielding plate 24 is open either in a case wherein external light is used or in a case wherein illumination light is used.

When a monitor image of an object such as the user is displayed by using external light, light entering from the second display window 3 is transmitted through the lightguide plate 27 of the surface light source 26, and enters the transmission type liquid crystal display device 12. The light transmitted through the liquid crystal display device 12 then exits from the first display window 4, as indicated by a broken arrow line 106 in FIG. 7.

When a monitor image of an object such as the user is displayed by using illumination light, the illumination light which exits from the exit surface of the lightguide plate 27 of the surface light source 26 enters the transmission type liquid crystal display device 12, and the light transmitted through the liquid crystal display device 12 exits from the first display window 4, as indicated by a broken arrow line 107 in FIG. 7.

Figure 8:
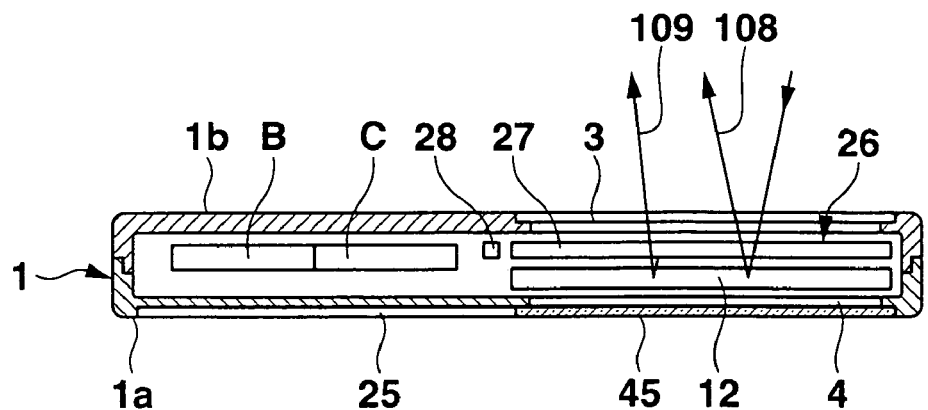
FIG. 8 is a sectional view of a digital camera with a monitor according to the third embodiment of the present invention while the shielding plate is closed.
Figure 9:
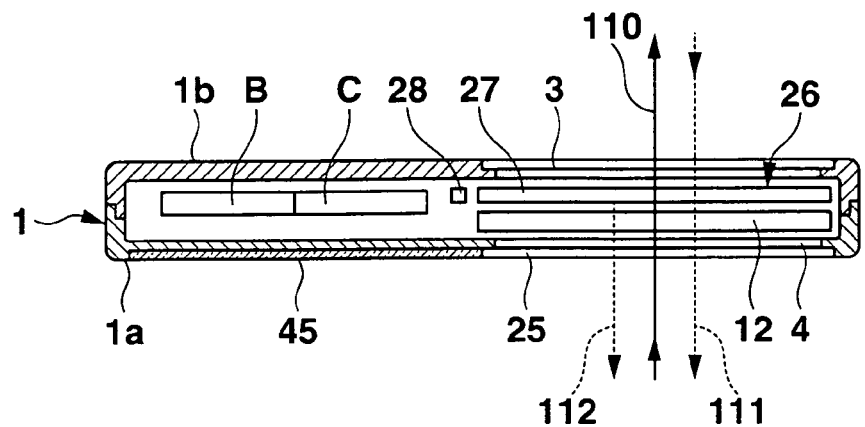
FIG. 9 is a sectional view of the digital camera according to the third embodiment while the shielding plate is open.

FIGS. 8 and 9 are sectional views showing the shielding plate closed state and open state of the above digital camera according to the third embodiment in which the present invention is applied to a digital camera with a monitor.

The digital camera with the monitor according to this embodiment includes a semi-transmission/reflection type liquid crystal display device as a double-sided display type monitor image display device 12. In this camera, a surface light source 26 which emits illumination light toward the semi-transmission/reflection type liquid crystal display device 12 and transmits light entering from a surface facing a second display window 3 and a surface facing the liquid crystal display device 12 is placed between the second display window 3 on the rear surface of a camera body 1 and the liquid crystal display device 12, and a non-reflection display window shielding plate 45 is provided on the front surface 1a of the camera body 1. Other arrangements are the same as those of the first and second embodiments.

Figure 10:
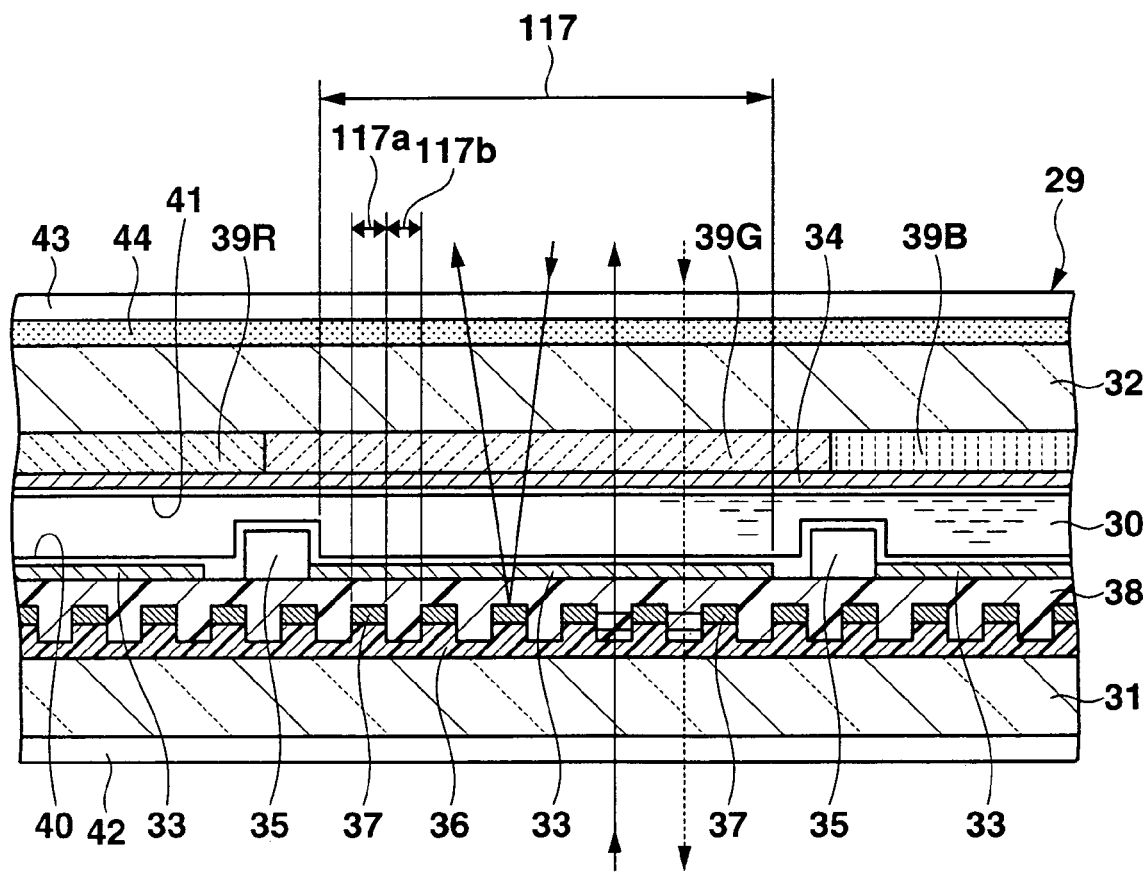
FIG. 10 is a sectional view of part of a semi-transmission/reflection type liquid crystal display device.

FIG. 10 is a sectional view of part of the semi-transmission/reflection type liquid crystal display device 12. The liquid crystal display device 12 has an arrangement in which transparent electrodes 33 and 34 forming-a plurality of pixel 117 arranged in a matrix form in the row direction (the horizontal direction of the screen) and column direction (the vertical direction of the screen) are provided in the opposing regions on the opposing inner surfaces of a pair of transparent substrates 31 and 32 which face each other through a liquid crystal layer 30. A plurality of reflecting films 37 partially corresponding to the plurality of pixels 117 are provided between the surface of one substrate, e.g., the lower substrate (to be referred to as a rear substrate hereinafter) 31 and the electrodes 33 on the inner surface of the substrate. A plurality of polarizing plates 42 and 43 are arranged on the outer surfaces of the pair of substrates 31 and 32. Reflection display portions 117a which reflect light which enters from the surface of the other substrate, i.e., the outer surface side of the front substrate 32, and make the light exit from the outer surface side of the front substrate 32 are formed in regions corresponding to the reflecting films 37 in the plurality of pixels 117. Transmission display portions 117b which transmit light entering from the outer surface side of the rear substrate 31 and make the light exit to the outer surface side of the front substrate 32 are formed in other regions.

In the semi-transmission/reflection type liquid crystal display device 12, the reflecting films 37 are formed on the film surface of a transparent uneven surface film 36 provided, on the substrate surface of the rear substrate 31, throughout at least the region where the plurality of pixels 117 are arranged, except for the plurality of recess portions.

The uneven surface film 36 is formed such that a plurality of recess portions, each having a width equal to or less than 1/10 the width of the pixel 117 (to be referred to as the pixel width hereinafter), e.g., a width 1/50 to 1/10 the pixel width, are formed on the film surface of the transparent film in correspondence with the respective pixels 117 at intervals corresponding to a plurality of portions in the pixels 117. The plurality of recess portions are, for example, slit-like recess portions each having an elongated shape extending along the longitudinal direction of the pixel 117 (the vertical direction on the drawing surface) and a length corresponding to the region of the pixel 117 excluding its two end portions in the longitudinal direction. These recess portions are formed parallel to each other in the regions corresponding to the plurality of pixels 117 at intervals almost equal to the width of each recess portion.

Referring to FIG. 10, the widths of the recess portions of the uneven surface film 36 and the intervals between them are shown in an exaggerated form for the sake of convenience. The pixel width is 100 to 250 μm and the widths and intervals of the plurality of recess portions of the uneven surface film 36 are 10 μm or less, for example, fall within the range of 5 to 10 μm. Therefore, the number of recess portions in one pixel 117 is 10 or more (e.g., 10 to 25).

The reflecting films 37 are formed by depositing a high-reflectance metal such as an aluminum-based alloy on the film surface of the uneven surface film 36 except for the plurality of recess portions, or plating the film surface with the metal.

The semi-transmission/reflection type liquid crystal display device 12 is an active matrix liquid crystal display device in which the plurality of pixel electrodes 33 arranged in a matrix form, a plurality of TFTs 35 respectively connected to the pixel electrodes 33, and a plurality of gate and data interconnections (not shown) are provided on the inner surface of the rear substrate 31. The counter electrode 34 in the form of a single film is provided on the inner surface of the front substrate 32. The plurality of pixel electrodes 33, the TFTs 35, and the gate and data interconnections are formed on a transparent planarizing insulating film 38 which is provided to cover the uneven surface film 36 and reflecting film 37. The counter electrode 34 is formed on color filters 39R, 39G, and 39B of three colors, i.e., red, green, and blue, provided on the inner surface of the front substrate 32 in correspondence with the plurality of pixels.

Aligning films 40 and 41 are respectively provided on the inner surfaces of the pair of substrates 31 and 32 so as to cover the electrodes 33, 34.

The substrates 31, 32 are joined to each other through a seal member (not shown) which surrounds the display area where the plurality of pixels 117 are arranged in a matrix form. The liquid crystal layer 30 is provided in the region surrounded by the seal member between the substrates 31, 32.

The semi-transmission/reflection type liquid crystal display device 12 is, for example, a normally white mode TN liquid crystal display device, in which the liquid crystal molecules of the liquid crystal layer 30 are twisted/aligned at a twist angle of 90° between the substrates 31, 32, and the polarizing plates 42, 43 are arranged on the outer surfaces of the substrates 31, 32 such that their transmission axes are substantially perpendicular to each other.

A light diffusion layer 44 formed from a transparent adhesive material dispersed with light-diffusing particles is provided between the front substrate 32, located on the opposite side to the side where the reflecting films 37 are provided, and the polarizing plate 43 placed on the outer surface of the front substrate 32.

The semi-transmission/reflection type liquid crystal display device 12 displays an image on its front surface by either the transmission display mode in which the transmission of light, of light entering from the rear surface, which strikes the transmission display portions 117b of the plurality of pixels 117 is controlled in accordance with the electric field applied to the liquid crystal layer 30, or the reflection display mode in which light, of light entering from the front surface, which strikes the reflection display portions 117a of the plurality of pixels 117 and is transmitted through the liquid crystal layer 30 is reflected by the reflecting film 37 on the inner surface of the rear substrate 31, and the emergence of the reflected light to the front surface is controlled in accordance with the electric field applied to the liquid crystal layer 30 of the plurality of pixels 117. The semi-transmission/reflection type liquid crystal display device 12 displays an image on the rear surface by the transmission display mode in which the transmission of light, light entering from the front surface, which strikes the transmission display portions 117b of the plurality of pixels 117 is controlled in accordance with the electric field applied to the liquid crystal layer 30 of the plurality of pixels 117. Each image displayed on either of the surfaces is a full-color image formed from three colors, i.e., red, green, and blue, which is colored by the color filters 39R, 39G, and 39B corresponding to the plurality of pixels 117.

The reflection display mode of displaying an image on the front surface of the semi-transmission/reflection type liquid crystal display device 12 is the display mode using a single polarizing plate, i.e., the polarizing plate 43, which is made to serve both as a polarizer and an analyzer.

The semi-transmission/reflection type liquid crystal display device 12 is placed in the camera body 1 such that the front surface of the device (the outer surface of the front-side polarizing plate 43) faces the second display window 3, and the other surface, i.e., the surface on which the reflecting films 37 are formed (the outer surface of the rear-side polarizing plate 42) faces the first display window 4. The liquid crystal display device 12 is connected to a display device driving circuit provided in the camera body 1.

The display device driving circuit is designed to write laterally inverted image data in the semi-transmission/reflection type liquid crystal display device 12 in accordance with the operation of an image inverting key 11 as in the first embodiment.

The surface light source 26 has the same arrangement as that of the surface light source 26 in the second embodiment described above. The surface light source 26 is placed between the second display window 3 and the semi-transmission/reflection type liquid crystal display device 12 such that the exit surface of the lightguide plate 27 faces the liquid crystal display device 12 and the reflecting surface of the lightguide plate 27 faces the second display window 3, and is connected to a light source driving circuit (not shown) provided in the camera body 1.

The digital camera of this embodiment uses the semi-transmission/reflection type liquid crystal display device 12 as a monitor image display device. The liquid crystal display device 12 has an arrangement in which transparent electrodes 33 and 34 which form the plurality of pixels 117 arranged in a matrix form are provided in the opposing regions on the opposing inner surfaces of the pair of transparent substrates 31 and 32 which face each other through the liquid crystal layer 30, the reflecting films 37 partially corresponding to the plurality of pixels 117 are provided between the substrate surface of the rear substrate 31 and the electrodes 33 on the inner surface of the substrate, and the polarizing plates 42 and 43 are arranged on the outer surfaces of the pair of substrates 31 and 32. The reflection display portions 117a which reflect light which enters from the outer surface side of the front substrate 32, and make the light exit from the outer surface side of the front substrate 32 are formed in regions corresponding to the reflecting films 37 in the plurality of pixels 117. The transmission display portions 117b which transmit light entering from the outer surface side of the rear substrate 31 and make the light exit to the outer surface side of the front substrate 32 are formed in other regions. Since the semi-transmission/reflection type liquid crystal display device 12 is placed such that the surface on which the reflecting films 37 are provided (the outer surface of the rear-side polarizing plate 42) faces the first display window 4, a monitor image of an object such as scenery can be displayed on the second display window 3 by arbitrarily selecting either the transmission display mode using external light entering from the first display window 4 or the reflection display mode using external light entering from the second display window 3, i.e., the reflection display mode in which light which enters from that surface of the semi-transmission/reflection type liquid crystal display device 12 facing the second display window 3 and is transmitted through the liquid crystal layer 30 is reflected by the reflecting films 37. In addition, a monitor image of an object such as the user himself/herself can be displayed on the first display window 4 by the transmission display mode using external light entering from the second display window 3.

In this embodiment, as described above, the uneven surface film 36 on which the plurality of slit-like recess portions, each having a length corresponding to the region of the pixel 117 excluding its two end portions, are formed parallel to each other at intervals almost equal to the width of each recess portion is provided on the substrate surface of the rear substrate 31 of the semi-transmission/reflection type liquid crystal display device 12, and the reflecting films 37 are formed on the film surface of the uneven surface film 36 except for the plurality of recess portions. With this arrangement, the total area of the reflection display portions 117a of the plurality of pixels 117, i.e., the opening ratio of reflection display, can be made larger than the total area of the transmission display portions 117b of the plurality of pixels 117, i.e., the opening ratio of transmission display, thereby ensuring sufficient brightness for the reflection display.

In addition, since the surface light source 26 is placed between the second display window 3 and the semi-transmission/reflection type liquid crystal display device 12, this digital camera can display a monitor image of an object such as scenery on the second display window 3 by the reflection display mode using illumination light from the surface light source 26 in addition to the reflection display mode using external light. The digital camera can also display a monitor image of an object such as the user himself/herself on the first display window 4 by the transmission display mode using illumination light from the surface light source 26 in addition to the transmission display mode using external light.

In the reflection display mode of displaying a monitor image of an object such as scenery on the second display window 3 by using external light, of the light which enters from the second display window 3, is transmitted through the lightguide plate 27 of the surface light source 26, and strikes the semi-transmission/reflection type liquid crystal display device 12, light which is transmitted through the liquid crystal layer 30 of the reflection display portions 117a of the plurality of pixels 117 of the liquid crystal display device 12 and reflected by the reflecting films 37 as indicated by the arrow lines in FIG. 10 is made to be transmitted through the lightguide plate 27 and exit from the second display window 3 as indicated by an arrow line 108 in FIG. 8.

In the reflection display mode of displaying a monitor image of an object such as scenery by using illumination light, of the light which strikes the liquid crystal display device 12, light which is transmitted through the liquid crystal layer 30 of the reflection display portions 117a of the plurality of pixels 117 of the liquid crystal display device 12 and reflected by the reflecting films 37 as indicated by the arrow lines in FIG. 10 is made to be transmitted through the lightguide plate 27 and exit from the second display window 3 as indicated by an arrow line 109 in FIG. 8.

Both the reflection display modes of displaying a monitor image of an object such as scenery by using external light and by using illumination light are performed by making the reflecting film 37 of the semi-transmission/reflection type liquid crystal display device 12 reflect incident light. Therefore, these reflection display modes can be performed regardless of whether the display window shielding plate 45 is closed or open. However, closing the display window shielding plate 45 as shown in FIG. 8 can cover the first display window 4 with the display window shielding plate 45.

In this embodiment, since the display window shielding plate 45 is a non-reflection shielding plate, even if a monitor image of an object such as scenery is displayed by the reflection mode while the display window shielding plate 45 is closed, light, of the light entering the semi-transmission/reflection type liquid crystal display device 12 from the second display window 3 or surface light source 26, which is transmitted through the display portions 117b of the plurality of pixels 117 of the semi-transmission/reflection type liquid crystal display device 12, is not reflected by the display window shielding plate 45. This makes it possible to display a high-quality monitor image on the first display window 4.

The transmission display mode of displaying a monitor image of an object such as scenery on the second display window 3 by using external light is performed while the display window shielding plate 45 is open. In this case, light which enters from the first display window 4 and is transmitted through the transmission display portions 117b of the plurality of pixels 117 of the semi-transmission/reflection type liquid crystal display device 12 as indicated by the arrow lines in FIG. 10 is made to be transmitted through the lightguide plate 27 of the surface light source 26 and exit from the second display window 3 as indicated by an arrow line 110 in FIG. 9.

A monitor image of an object such as the user is displayed on the first display window 4 by the transmission display mode, with the display window shielding plate 24 being open, both when external light is used and when illumination light is used.

When a monitor image of an object such as the user himself/herself is to be displayed by using external light, light entering from the second display window 3 is transmitted through the lightguide plate 27 of the surface light source 26 and strikes the semi-transmission/reflection type liquid crystal display device 12. This light which is transmitted through the display portions 117b of the plurality of pixels 117 of the liquid crystal display device 12 as indicated by the broken arrow line in FIG. 10 exits from the first display window 4.

When a monitor image of an object such as the user himself/herself is to be displayed by using illumination light, the light which exits from the exit surface of the lightguide plate 27 strikes the semi-transmission/reflection type liquid crystal display device 12, is transmitted through the display portions 117b of the plurality of pixels 117 of the semi-transmission/reflection type liquid crystal display device 12 as indicated by the broken arrow line in FIG. 10, and exits from the first display window 4 as indicated by a broken arrow line 112 in FIG. 9.

In this embodiment, the light diffusion layer 44 is provided between the substrate (front substrate) 32 on the side of the liquid crystal display device 12 opposite to the side where the reflecting films 37 are provided, and the front-side polarizing plate 43 is placed on the outer surface of the front substrate 32. With this arrangement, a monitor image can be displayed with a uniform luminance distribution at a wide viewing angle both in a case wherein a monitor image of an object such as scenery is to be displayed on the second display window 3 by the reflection display mode using external light, the reflection mode using illumination light, or the transmission display mode using external light, and in a case wherein a monitor image of an object such as the user himself/herself is to be displayed on the first display window 4 by the transmission display mode using external light or the transmission display mode using illumination light.

In the first to third embodiments described above, the present invention is applied to digital cameras with monitors. However, the present invention can be applied to other image sensing devices with monitors, e.g., a cell phone having a digital camera function and monitor image display function.

Additional advantages and modifications will readily occur to those skilled in the art. Therefore, the invention it its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic device comprising:
   a device body having a first display window on a first surface of the device body and a second display window corresponding to the first display window on a second surface opposing the first surface;
   a display device which is placed in the device body, and has a first side facing the first display window and a second side opposing the first side and facing the second display window, the display device being driven by an electronic circuit to display images which are observed from the first and second sides; and
   a display window shielding plate which is provided on one of the first surface and the second surface of the device body, which is retractable from one of the first and second display windows, and which reflects light that enters from the other of the first and second display windows and that is transmitted through the display device to the one of the first and second display windows.

2. A device according to claim 1, wherein the device body comprises an imaging lens which is provided on one of the first and second surfaces of the device body to form an image on the display device.

3. A device according to claim 1, wherein the display device comprises a transmission type liquid crystal display device which displays a first image using light exiting from the second side by controlling transmission of light entering from the first side, and displays a second image using light exiting from the first side by controlling transmission of light entering from the second side.

4. A device according to claim 3, wherein the device body further includes a surface light source which is provided between the liquid crystal display device and at least one of the first and second display windows, the surface light source emitting illumination light toward the liquid crystal display device and transmitting light entering from a surface facing said at least one of the first and second display windows and a surface facing the liquid crystal display device.

5. A device according to claim 1, wherein the display device includes a semi-transmission/ reflection type liquid crystal display device which performs transmission display of a first transmission image using light exiting from a side of the second surface of the device body by controlling transmission of a first part of light entering from a side of the first surface of the device body, performs transmission display of a second image using light exiting from the first surface by controlling transmission of a part of light entering from the second surface, and performs reflection display of a first reflection image using reflected light from the first surface by reflecting a second part of the light entering from the first surface so as to control an intensity of light exiting from the first surface.

6. An image sensing device with a monitor, comprising:
a device body which houses at least an electronic circuit that drives a display device and an electronic image sensing unit, the device body including an imaging lens and a first display window which are provided on a front surface of the device body, and including a second display window which corresponds to the first display window and is formed on a rear surface opposing the front surface of the device body;
wherein the display device is a double-sided display type monitor image display device which is placed in the device body such that a first surface faces the first display window and a second surface opposing the first surface faces the second display window, and which displays images sensed by the electronic image sensing unit on the first surface and the second surface so as to allow observation of the images from the front surface and the rear surface of the device body,
wherein the monitor image display device includes a semi-transmission/reflection type liquid crystal display device which comprises: (i) electrodes forming a plurality of pixels arranged in a matrix form provided in opposing regions on opposing inner surfaces of a pair of substrates which face each other through a liquid crystal layer, (ii) at least one reflecting film which reflects a part of light entering from the monitor image display device, and (iii) polarizing plates provided on outer surfaces of the pair of substrates, and
wherein the liquid crystal display device performs transmission display of a first transmission image using light exiting from the second surface by controlling transmission of a first part of light entering from the first surface, performs transmission display of a second image using light exiting from the first surface by controlling transmission of a part of light entering from the second surface, and performs reflection display of a first reflection image using reflected light from the first surface by reflecting a second part of the light entering from the first surface so as to control an intensity of light exiting from the first surface.

7. A device according to claim 6, wherein the monitor image display device further includes a display window shielding plate provided on the front surface of the device body so as to be retractable from the first display window, the display window shielding plate reflecting light which enters from a surface facing the second display window and is transmitted through the monitor image display device.

8. A device according to claim 7, wherein the display window shielding plate is provided so as to be slidable between a closed state in which the plate covers the first display window and an open state in which the plate is retracted to a side of the first display window.

9. A device according to claim 7, wherein the display window shielding plate includes a scattering/reflecting plate which scatters and reflects light transmitted through the liquid crystal display device.

10. A device according to claim 6, further comprising a surface light source which is placed between the second display window and the monitor image display device, which emits illumination light to the monitor image display device, and which transmits light entering from a surface facing the second display window and a surface facing the monitor image display device.

11. A device according to claim 6, wherein:
reflecting films partially corresponding to the plurality of pixels are provided between a substrate surface of one of the pair of substrates and the electrodes on the inner surface of the substrate,
a reflection display portion which makes the reflecting films reflect light entering from the outer surface of the other one of the pair of substrates and makes the light exit to the outer surface of said other one of the pair of substrates is formed from regions corresponding to the reflecting films in the plurality of pixels, and
a transmission display portion which transmits light entering from the outer surface of said one of the pair of substrates and makes the light exit to the outer surface of said other one of the pair of substrates is formed from other regions which do not correspond to the reflecting films.

12. A device according to claim 11, wherein the semi-transmission/reflection type liquid crystal display device is placed such that the substrate on the side where the reflecting films are provided is made to face the first display window.

13. A device according to claim 12, wherein the semi-transmission/reflection type liquid crystal display device further includes a diffusion layer which is provided between the polarizing plate and the substrate located on the second display window side and diffuses transmitted light.

14. A device according to claim 12, further comprising a surface light source which is placed between the second display window and the semi-transmission/reflection type liquid crystal display device, emits illumination light to the semi-transmission/reflection type liquid crystal display device, and transmits light entering from a surface facing the second display window and a surface facing the liquid crystal display device.

15. A device according to claim 6, wherein the device body comprises switching means, provided for the monitor image display device, for switching between front-surface display observed from the first surface side and rear-surface display observed from the second surface side on a rear side of the first surface.

16. A device according to claim 15, wherein the electronic circuit which drives the display device comprises image inverting means for displaying a laterally inverted image obtained by laterally inverting an image in accordance with operation of the switching means.

17. A digital camera with a monitor, comprising:

a device body which houses at least an electronic circuit that drives a display device and an electronic image sensing unit, the device body including an imaging lens and a first display window which are provided on a front surface of the device body, and a second display window which corresponds to the first display window and is formed on a rear surface opposing the front surface of the device body;

a semi-transmission/reflection type liquid crystal display device which comprises: (i) electrodes forming a plurality of pixels arranged in a matrix form provided in opposing regions on opposing inner surfaces of a pair of substrates which face each other through a liquid crystal layer, (ii) at least one reflecting film which reflects a part of light entering from a monitor image display device, and (iii) polarizing plates provided on outer surfaces of the pair of substrates, wherein the liquid crystal display device is placed in the device body such that a first surface faces the first display window and a second surface on a rear side of the first surface faces the second display window, and the liquid crystal display device performs transmission display of a first transmission image using light exiting from the second surface by controlling transmission of a first part of light entering from the first surface, performs transmission display of a second image using light exiting from the first surface by controlling transmission of a part of light entering from the second surface, and performs reflection display of a first reflection image using reflected light from the first surface by reflecting a second part of the light entering from the first surface so as to control an intensity of light exiting from the first surface; and a surface light source which is placed between the second display window and the semi-transmission/reflection type liquid crystal display device, emits illumination light to the semi-transmission/reflection type liquid crystal display device, and transmits light entering from a surface facing the second display window and a surface facing the liquid crystal display device.

18. An electronic device comprising:

a device body having a first display window on a first surface of the device body and a second display window corresponding to the first display window on a second surface opposing the first surface; and a display device which is placed in the device body, and which comprises a first side facing the first display window and a second side opposing the first side and facing the second display window, display device being driven by an electronic circuit to display images which are observed from the first and second sides, wherein the display device includes a semi-transmission/reflection type liquid crystal display device which performs transmission display of a first transmission image using light exiting from a side of the second surface of the device body by controlling transmission of a first part of light entering from a side of the first surface of the device body, performs transmission display of a second image using light exiting from the first surface by controlling transmission of a part of light entering from the second surface, and performs reflection display of a first reflection image using reflected light from the first surface by reflecting a second part of the light entering from the first surface so as to control an intensity of light exiting from the first surface.

19. An image sensing device with a monitor, comprising:

a device body which houses at least an electronic circuit that drives a display device and an electronic image sensing unit, the device body including an imaging lens and a first display window which are provided on a front surface of the device body, and a second display window which corresponds to the first display window and is formed on a rear surface opposing the front surface of the device body, wherein the display device is a double-sided display type monitor image display device which is placed in the device body such that a first surface faces the first display window and a second surface opposing the first surface faces the second display window, and which displays images sensed by the electronic image sensing means on the first surface and the second surface so as to allow observation of the images from the front surface and the rear surface of the device body; and a display window shielding plate which is provided on one of the front surface and the rear surface of the device body, which is retractable from one of the first and second display windows, and which reflects light that enters from the other of the first and second display windows and that is transmitted through the display device to the one of the first and second display windows.

* * * * *